Figure 1:
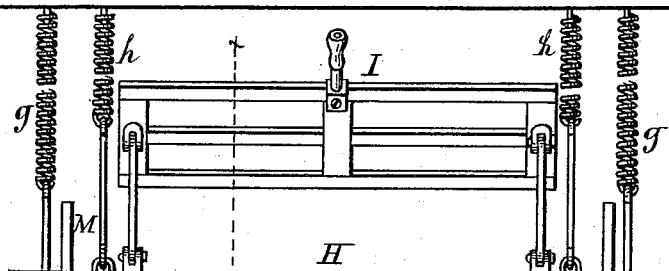

(No Model.)

C. W. O'NEILL.
SOLDERING MACHINE.

No. 246,544. Patented Aug. 30, 1881.

Witnesses,
Henry Frankfurter,
J. Taylor Hair

Inventor.
per Charles W. O'Neill
Attorney.

UNITED STATES PATENT OFFICE.

CHARLES W. O'NEILL, OF CHICAGO, ILLINOIS, ASSIGNOR OF ONE-FOURTH TO JOHN W. SMITH, OF SAME PLACE.

SOLDERING-MACHINE.

SPECIFICATION forming part of Letters Patent No. 246,544, dated August 30, 1881.

Application filed June 28, 1881. (No model.)

*To all whom it may concern:*

Be it known that I, CHARLES W. O'NEILL, of Chicago, in Cook county, Illinois, have invented certain Improvements in Apparatus for Soldering Fruit, Meat, and other Cans, of which the following is a specification.

My invention relates to an apparatus for soldering fruit and other cans; and it consists in the construction and arrangement of parts, as hereinafter more fully described and claimed.

In order that my invention may be understood, I will now describe an embodiment of it which I have illustrated in the drawings annexed hereto, in which—

Figures 4, 5:
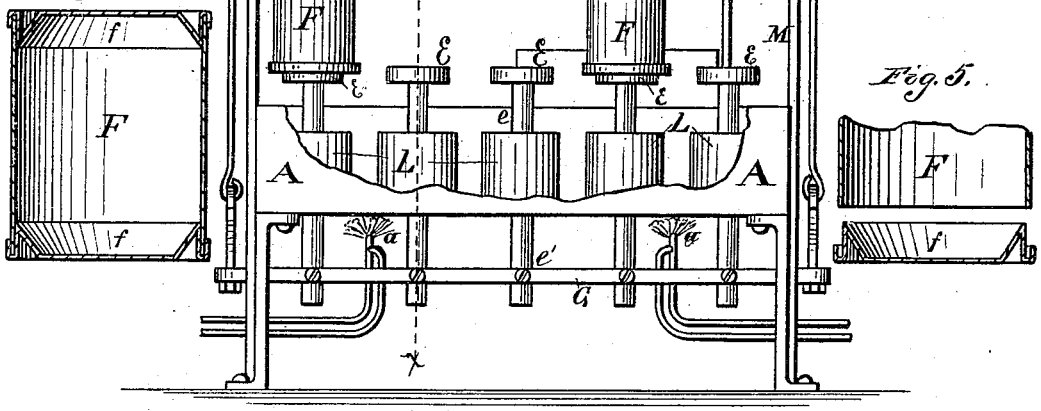
Figures 2, 3:
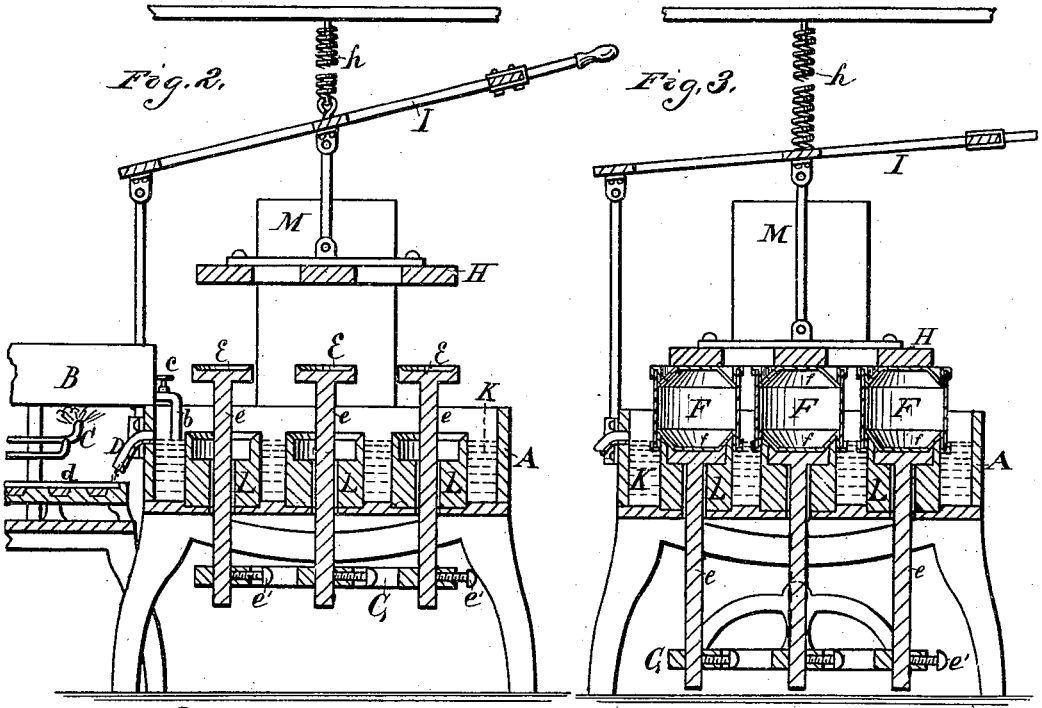

Figure 1 is a side elevation with a portion of the side of the bath removed. Fig. 2 is a section on the line *x* *x* of Fig. 1, and Figs. 3 is the same with a set of cans in place and depressed into the solder. Figs. 4 and 5 are sectional views, showing the construction of a can which I have invented and for which the machine shown is more particularly adapted. As I propose to apply for a patent on this can in another application, I will not more particularly describe it here.

A is a bath or box containing melted solder, kept hot by jets *a* or other equivalent means. This box is mounted on a suitable frame, and is kept full of solder to the required height by means of a supply-tank, B. The solder is melted in tank B and flows through pipe *b* into the bath, the amount of flow being regulated by a cock, *c*. A jet, C, keeps tank B hot and melts the solder. The solder in the bath is prevented from rising above the required level by an overflow, D. Solder that overflows at D may be run into bars, as at *d*, and remelted when wanted. E is a system of plungers, each composed of a head, E, and a stem, *e*, working up and down in the bath A. The heads of the plungers are shaped to fit the bottoms of the cans.

G is a frame, to which each stem *e* is attached by means of a set-screw, *e'*, which permits adjustment of the plungers to suit different sizes, styles, and shapes of cans. This frame is supported or counterbalanced by means of springs *g g*, or equivalent means, which also counterbalance the weight of the plungers and cans on them.

H is a frame suspended above the plungers and bath by springs *h*, and which may be depressed, when desired, by means of lever I. M are guides for this frame. F are the cans.

K represents the solder in the bath, and shows the level to which I propose to have it rise.

L is a system of stops in the bath, rising above the surface of the solder, and through which the stems *e* of the plungers extend, and which therefore prevent the solder running out around the plungers. These stops serve also to limit the downward motion of the plungers, and thus prevent the cans being dipped too far into the solder. The heads of the stops are cup-shaped, and the heads of the plungers enter these cups, so that the cans can be sufficiently depressed without the plungers entering the solder.

The operation of this machine is as follows, viz: The cans to be soldered are placed on the plungers, between them and frame H, as shown, one on each plunger. The frame H is then depressed by means of lever I, and forces the cans and plungers down till the latter strike the stops L, as shown in Fig. 3. The edges of the cans are then below the surface of the solder in the bath. The lever I is then allowed to rise, and the frame H is drawn up by its spring *h*, and the cans and plungers are caused to follow it up by the counterbalance-springs *g*. The cans are then turned end for end or removed, and a fresh set placed in position.

The apparatus illustrated is that designed more especially for the peculiar form of can invented by me and shown in the drawings; but it is, of course, understood that I do not limit myself to this particular form, but propose to vary the different parts of my machine to suit other forms, styles, and sizes of cans, and as convenience may dictate.

What I claim is, in a machine for soldering fruit and other cans—

1. The combination of the solder-bath A, plungers for supporting the cams, consisting of stems *e* and heads E, stops L, through which the stems of said plungers pass, frame G, having counterbalance-springs *g g*, and frame H, having lever I and counterbalance-springs *h h*, whereby the cams are lowered into the bath and raised therefrom, substantially as shown and described.

2. The combination of the solder-bath A, supply-tank B, jets a C for maintaining the solder in a fluid condition, pipe b, connecting said bath and tank, and provided with cock c, the overflow D, and molds d, substantially as and for the purpose shown and described.

3. The combination, with the solder-bath A, frame H, and operating devices, of the counterbalanced frame G and the plungers E, having stems e, adjustably attached to frame G, substantially as and for the purpose shown and described.

4. The combination, with the bath A, having cup-shaped stops L, of plungers composed of stems e and heads E, said stems being adjustably attached to a counterbalanced frame, G, and the heads E being adapted to enter the cup-shaped cavities of the stops L, substantially as shown and described.

5. The combination of the bath A, counterbalanced frames G H, guides M M, plungers E, and stops L, substantially as shown and described.

CHARLES W. O'NEILL.

Attest:
W. S. BATES,
J. TAYLOR HAIR.